US009377104B2

(12) United States Patent
Kim

(10) Patent No.: US 9,377,104 B2
(45) Date of Patent: Jun. 28, 2016

(54) METHOD AND SYSTEM FOR CONTROLLING DRIVING OF VEHICLE

(71) Applicants: Hyundai Motor Company, Seoul (KR); Kia Motors Corporation, Seoul (KR)

(72) Inventor: Seungbum Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 46 days.

(21) Appl. No.: 14/550,336

(22) Filed: Nov. 21, 2014

(65) Prior Publication Data

US 2016/0084378 A1 Mar. 24, 2016

(30) Foreign Application Priority Data

Sep. 22, 2014 (KR) ........................ 10-2014-0126192

(51) Int. Cl.
*F02D 9/06* (2006.01)
*F16H 63/50* (2006.01)

(52) U.S. Cl.
CPC ...................................... *F16H 63/50* (2013.01)

(58) Field of Classification Search
None
See application file for complete search history.

(56) References Cited

U.S. PATENT DOCUMENTS

| | | | | |
|---|---|---|---|---|
| 5,150,681 A * | 9/1992 | Kull | B60Q 1/44 | 123/198 D |
| 5,439,429 A * | 8/1995 | Lee | F02D 9/02 | 477/205 |
| 6,186,253 B1 * | 2/2001 | Barnhart | B60K 6/46 | 180/165 |
| 6,881,174 B2 * | 4/2005 | McCall | B60K 28/00 | 477/107 |
| 6,916,272 B2 * | 7/2005 | Chun | B60K 28/02 | 477/207 |
| 7,771,312 B2 * | 8/2010 | Sigmund | B60W 10/06 | 477/101 |
| 8,554,419 B2 * | 10/2013 | Crombez | B60T 7/042 | 180/282 |
| 8,589,047 B2 * | 11/2013 | Mueller | B60W 10/06 | 701/70 |
| 8,798,886 B2 * | 8/2014 | Nodera | F02D 11/105 | 477/211 |
| 8,930,053 B2 * | 1/2015 | Hashimoto | B60W 20/108 | 180/65.265 |
| 8,961,370 B2 * | 2/2015 | Kida | B60K 28/16 | 477/185 |
| 9,008,936 B2 * | 4/2015 | Shimada | F02D 29/02 | 701/70 |
| 9,163,567 B2 * | 10/2015 | Kouda | F02D 41/22 | |
| 2010/0036566 A1 * | 2/2010 | Hayami | B60W 10/06 | 701/48 |
| 2014/0136084 A1 * | 5/2014 | Takagi | F02D 11/106 | 701/110 |

FOREIGN PATENT DOCUMENTS

| | | |
|---|---|---|
| JP | 2005-291030 A | 10/2005 |
| JP | 2012-097622 A | 5/2012 |
| JP | 2012-153165 A | 8/2012 |
| JP | 2014-185549 A | 10/2014 |
| KR | 1999-0040769 A | 6/1999 |
| KR | 1999-0026451 U | 7/1999 |
| KR | 10-0941714 B1 | 2/2010 |
| KR | 10-2010-0104639 A | 9/2010 |

* cited by examiner

*Primary Examiner* — Dirk Wright

(74) *Attorney, Agent, or Firm* — Morgan, Lewis & Bockius LLP

(57) ABSTRACT

A method of controlling driving of a vehicle may include determining whether a vehicle speed exceeds a predetermined speed, determining whether a signal of an accelerator position sensor (APS) is input as a signal of an accelerator pedal, determining whether a signal of a brake position sensor (BPS) is input as a signal of a brake pedal, determining whether the signal of the BPS is input while overlapping the signal of the APS for over a predetermined time in a state where the signal of the APS is being input, determining whether the signal of the APS is input while overlapping the signal of the BPS for over a predetermined time in a state where the signal of the BPS is first being input, driving an engine in a first smart pedal control mode, and executing a second smart pedal control mode.

8 Claims, 3 Drawing Sheets

METHOD AND SYSTEM FOR CONTROLLING DRIVING OF VEHICLE

CROSS-REFERENCE TO RELATED APPLICATION

The present application claims priority to Korean Patent Application No. 10-2014-0126192 filed Sep. 22, 2014, the entire contents of which is incorporated herein for all purposes by this reference.

BACKGROUND OF THE INVENTION

1. Field of the Invention

The present invention relates to a method and a system for controlling driving of a vehicle, which safely drives a vehicle when a brake pedal signal and an accelerator pedal signal overlap for over a predetermined time.

2. Description of Related Art

In general, when a brake pedal is not appropriately returned when a driver steps on the brake pedal and then steps on an accelerator pedal to accelerate travelling while operating a vehicle, the driver presses harder on the accelerator pedal. When the brake pedal is completely returned at a time when the driver presses harder on the accelerator pedal, the vehicle may be momentarily and rapidly accelerated, which may cause a dangerous situation.

Accordingly, when a signal of the accelerator pedal and a signal of the brake pedal are input while overlapping, a vehicle driving control device (for example, an engine electronic control unit (ECU)) may determine that the accelerator pedal is fixed, and limit an RPM of an engine to an idle RPM to first secure safety in driving the vehicle.

That is, when a signal of an accelerator position sensor (APS) and a signal of a brake position sensor (BPS) are input to the ECU while overlapping, the ECU performs a control so that the vehicle moves in a restricted state for safety. The aforementioned control is referred to as a smart pedal control or an accelerator pedal safety control in a business field.

However, when the signal of the APS and the signal of the BPS are input to the ECU while overlapping in the related art, the ECU limits an RPM of the engine only to an idle RPM to perform a simple control, thereby failing to cope with various situations of the driving of the vehicle.

Further, there is a problem in that the smart pedal control cannot be currently applied to an ECU of a vehicle to which a mechanical throttle control method, not an electronic throttle control (ETC), is applied.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system for controlling driving of a vehicle, in which a smart pedal control, which safely drives a vehicle when a brake pedal signal and an accelerator pedal signal overlap for over a predetermined time, is applicable to a mechanical throttle body applied vehicle, as well as an ETC applied vehicle.

According to various aspects of the present invention, a method of controlling driving of a vehicle may include determining by a controller whether a vehicle speed exceeds a predetermined speed, determining by the controller whether a signal of an accelerator position sensor (APS) is input as a signal of an accelerator pedal, determining by the controller whether a signal of a brake position sensor (BPS) is input as a signal of a brake pedal, determining by the controller whether the signal of the BPS is input while overlapping the signal of the APS for over a predetermined time in a state where the signal of the APS is being input, determining by the controller whether the signal of the APS is input while overlapping the signal of the BPS for over a predetermined time in a state where the signal of the BPS is first being input, driving an engine by the controller in a first smart pedal control mode of limiting an RPM of the engine to an idle RPM when the signal of the BPS is input while overlapping the signal of the APS for over the predetermined time in the state where the signal of the APS is being input, and executing a second smart pedal control mode of driving the engine by the controller by setting an output torque of the engine to a torque limited value corresponding to an actual engine state when the signal of the APS is input while overlapping the signal of the BPS for over the predetermined time in a state where the signal of the BPS is first being input, and a demanded torque corresponding to a size of the signal of the APS is greater than the torque limited value corresponding to the actual engine state.

The method of controlling driving of the vehicle may further include releasing the first smart pedal control mode by the controller when a variation of the signal of the APS exceeds a predetermined value during execution of the first smart pedal control mode.

The method of controlling driving of the vehicle may further include releasing the first smart pedal control mode by the controller when a value of the signal of the APS or a value of the signal of the BPS is 0 during execution of the first smart pedal control mode.

The method of controlling driving of the vehicle may further include releasing the second smart pedal control mode by the controller when a variation of the signal of the APS exceeds a predetermined value during the execution of the second smart pedal control mode.

The method of controlling driving of the vehicle may further include releasing the second smart pedal control mode by the controller when a value of the signal of the APS is 0 during the execution of the second smart pedal control mode.

According to various aspects of the present invention, a method of controlling driving of a vehicle, to which a mechanical throttle body is applied may include determining by a controller whether a vehicle speed exceeds a predetermined speed, determining by the controller an opening quantity of a mechanical throttle detected by a throttle position sensor (TPS) exceeds a predetermined opening degree, determining by the controller whether a signal of a BPS is input for a predetermined time in a state where the opening quantity of the mechanical throttle exceeds the predetermined opening degree, and executing a third smart pedal control mode of driving an engine by the controller by setting an output torque of the engine to a torque limited value corresponding to an actual engine state when the signal of the BPS is input for the predetermined time in the state where the opening quantity of the mechanical throttle exceeds the predetermined opening degree, and a demanded torque corresponding to an operation quantity of an accelerator pedal is greater than the torque limited value corresponding to the actual engine state.

The method of controlling driving of the vehicle, to which the mechanical throttle body is applied, may further include releasing the third smart pedal control mode by the controller when a variation rate of the opening quantity of the throttle value detected by the TPS exceeds a predetermined value during an execution of the third smart pedal control mode, or when the opening quantity of the mechanical throttle valve is 0.

According to various aspects of the present invention, a system for controlling driving of a vehicle may include a vehicle speed sensor configured to detect a vehicle speed, an accelerator position sensor (APS) configured to detect an on-state and an operation quantity of an accelerator pedal, a brake position sensor (BPS) configured to detect an on-state and an operation quantity of a brake pedal, a throttle position sensor (TPS) configured to detect an opening quantity of a throttle, an engine configured to provide driving force of the vehicle, and an engine control unit configured to control the engine based on signals of the vehicle speed sensor, the APS, the BPS, and the TPS, in which the engine control unit executes a command for performing the method of controlling driving of the vehicle of the present invention.

As described above, according to various embodiments of the present invention, it is possible to apply a smart pedal control of safety driving a vehicle to a mechanical throttle body applied vehicle, as well as an ETC applied vehicle, when a brake pedal signal and an accelerator pedal signal overlap for over a predetermined time.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
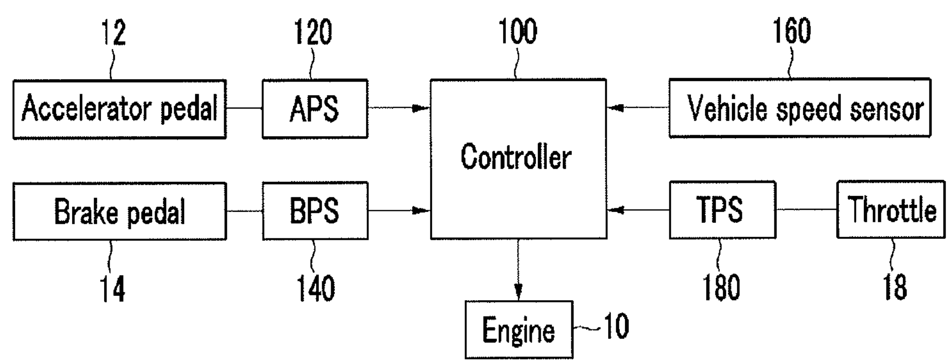
FIG. 1 is a block diagram of an exemplary vehicle driving control system according to the present invention.

FIG. 1 is a block diagram of a vehicle driving control system according to various embodiments of the present invention.

A vehicle driving control system according to various embodiments of the present invention is a system for performing a smart pedal control which safely drives a vehicle when a brake pedal signal and an accelerator pedal signal overlap for over a predetermined time.

The vehicle driving control system according to various embodiments of the present invention may include a vehicle speed sensor 160 for detecting a speed of a vehicle, an accelerator position sensor (APS) 120 for detecting an operation-on state and an operation quantity of an accelerator pedal 12, a brake position sensor (BPS) 140 for detecting an operation-on state and an operation quantity of a brake pedal 14, a throttle position sensor (TPS) 180 for detecting an opening quantity of a throttle 18, an engine 10 for providing driving force of a vehicle, and a controller 100 for controlling the engine 10 based on signals of the vehicle speed sensor 160, the APS 120, the BPS 140, and the TPS 180.

In various embodiments of the present invention, the vehicle speed sensor 12 may be formed as, for example, a vehicle speed sensor which is attached to a wheel to detect a rotation speed, and for another example, as a vehicle speed sensor which is attached to a final reduction gear of a transmission, but it should be understood as the scope of the present invention is not essentially limited thereto. As long as a configuration is capable of calculating a value corresponding to an actual vehicle speed, the technical spirit of the present invention is applicable thereto even though the configuration is different from the aforementioned configuration.

In various embodiments of the present invention, for example, the APS 120 may include a switch, which is turned on when a movement of the accelerator pedal 12 is detected, and a resistance sensor, of which a resistance value varies in connection with the movement of the accelerator pedal 12, but it should be understood as the scope of the present invention is not essentially limited thereto. As long as a configuration is capable of calculating a value corresponding to an actual movement of the accelerator pedal 12, the technical spirit of the present invention is applicable thereto even though the configuration is different from the aforementioned configuration.

In various embodiments of the present invention, for example, the BPS 140 may include a switch, which is turned on when a movement of the brake pedal 12 is detected, and a resistance sensor, of which a resistance value varies in connection with the movement of the brake pedal 14, but it should be understood as the scope of the present invention is not essentially limited thereto. As long as a configuration is capable of calculating a value corresponding to an actual movement of the brake pedal 14, the technical spirit of the present invention is applicable thereto even though the configuration is different from the aforementioned configuration.

In various embodiments of the present invention, for example, the TPS 180 may include a resistance sensor, of which a resistance value varies in connection with a movement of the throttle 18, but it should be understood as the scope of the present invention is not essentially limited thereto. As long as a configuration is capable of calculating a value corresponding to an actual movement of the throttle 18, the technical spirit of the present invention is applicable thereto even though the configuration is different from the aforementioned configuration.

In various embodiments of the present invention, the throttle 18 may be a mechanical throttle, which mechanically moves according to a movement of the accelerator pedal 12, or an electronic control throttle, which receives a movement of the accelerator pedal 12 in a form of an electric signal and electronically controls driving of the throttle.

The engine 10 may be a gasoline engine, a diesel engine, and the like, which are generally mounted in the vehicle, but it should be understood as the scope of the present invention is not essentially limited thereto. As long as an engine provides driving force to the vehicle, the technical spirit of the present invention is applicable thereto even though the engine is different from the aforementioned engine.

The controller 100 is more than one microprocessor operated by a set program, and/or hardware including the microprocessor, and the set program may include a series of commands for performing a vehicle driving control method according to various embodiments of the present invention, which is to be described below.

In various embodiments of the present invention, the controller 100 may include an engine control unit (ECU) or be included in ECU.

Hereinafter, a vehicle driving control method according to various embodiments of the present invention will be described with reference to the accompanying drawings.

Figure 2:
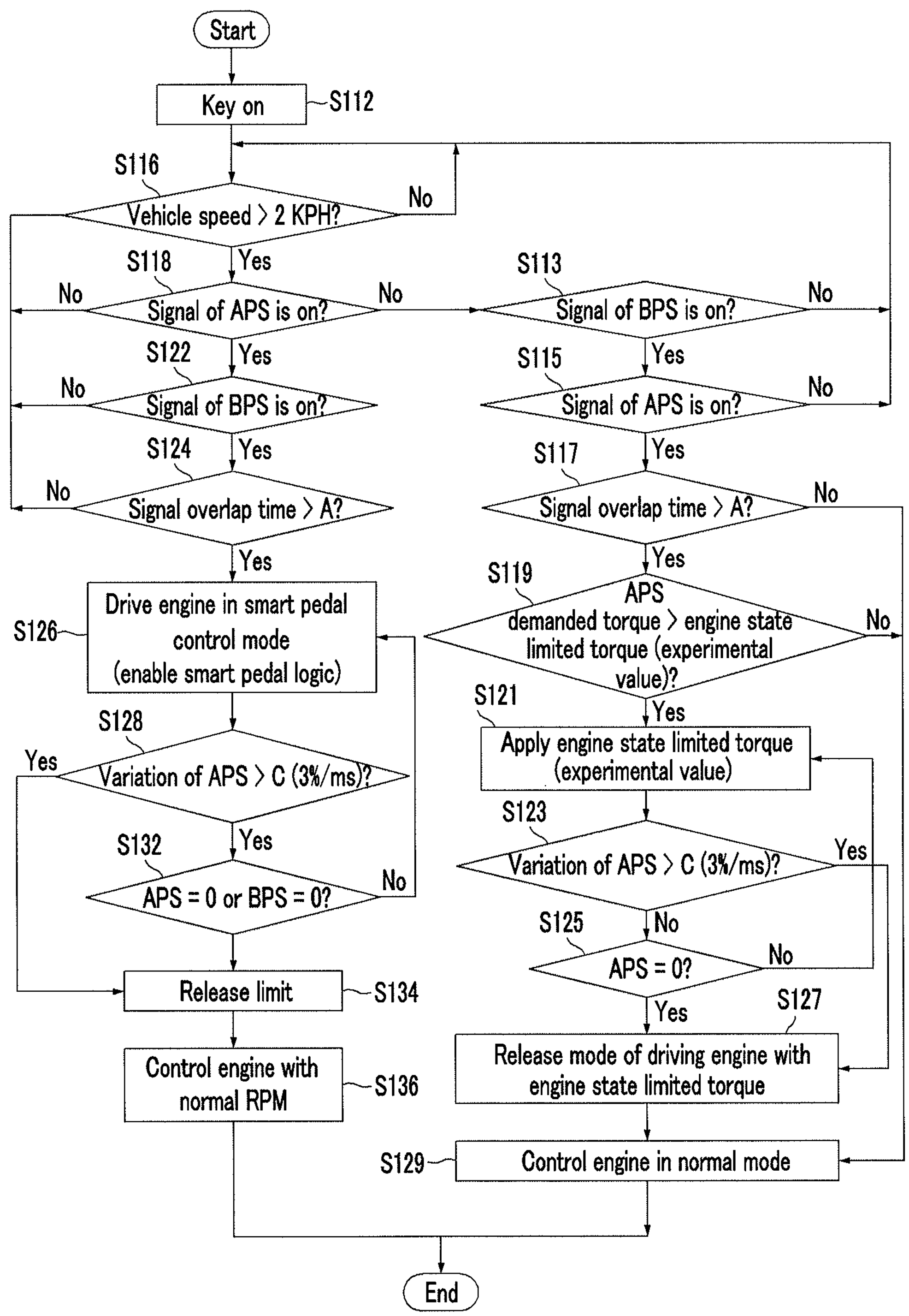
FIG. 2 is a flowchart illustrating an exemplary vehicle driving control method according to the present invention.

FIG. 2 is a flowchart illustrating a vehicle driving control method according to various embodiments of the present invention.

The vehicle driving control method according to various embodiments of the present invention may be implemented in a vehicle to which the electronic control throttle (electronic throttle control (ETC)) is applied.

As illustrated in FIG. 2, the controller 100 determines whether a vehicle speed detected by the vehicle speed sensor 160 exceeds a predetermined speed (for example, 2 KPH) in a key-on state, that is, during an operation of the vehicle (S112 and S116).

When the vehicle speed exceeds the predetermined speed (for example, 2 KPH), the controller 100 determines whether a signal of the APS is input as a signal of the accelerator pedal 12 (S118).

When the APS signal is input, that is, the APS 120 is on, the controller 100 determines whether a signal of the BPS is input as a signal of the brake pedal 14 (S122).

When the signal of the BPS is input, that is, the BPS 140 is on, the controller 100 determines whether the signal of the BPS is input while overlapping the signal of the APS for over a predetermined time (for example, 0.5 second) in the state where the signal of the APS is being input (S124).

In the meantime, when the signal of the APS is not input in operation S118, the controller 100 may determine whether the signal of the APS is input while overlapping the signal of the BPS for over a predetermined time (for example, 0.5 second) in the state where the signal of the BPS is input (S113, S115, and S117).

When the signal of the BPS is input while overlapping the signal of the APS for over the predetermined time in the state where the signal of the APS is being input in operation S124, the controller 100 drives the engine 100 in a first smart pedal control mode of limiting an RPM of the engine to an idle RPM (S126). That is, when the signal of the APS and the signal of the BPS are input while overlapping for about 0.5 second or more, the controller 100 limits the engine 100 to have the idle RPM for safety of the driving of the vehicle to drive the vehicle.

In the meantime, when the signal of the APS is input while overlapping the signal of the BPS for over the predetermined time in the state where the signal of the BPS is first being input in operation S117, the controller 100 determines whether a demanded torque corresponding to a size of the signal of the APS is greater than a torque limited value corresponding to an actual engine state (S119). The torque limited value corresponding to the actual engine state is a value pre-determined and set by an experimental value.

When the demanded torque corresponding to the size of the signal of the APS is greater than the torque limited value corresponding to the actual engine state in operation S119, the controller 100 executes a second smart pedal control mode of driving the engine 10 by setting an output torque of the engine to the torque limited value corresponding to the actual engine state (S121). The reason of controlling the driving of the engine 10 with the torque limited value corresponding to the actual engine state, instead of the demanded torque is to secure safety of a driver by first applying a torque appropriate to the engine state, rather than the demanded torque according to an operation quantity of the accelerator pedal, even though the brake pedal is returned and restored in the case where the signal of the BPS and the signal of the APS overlap for over the predetermined time.

When a variation of the signal of the APS exceeds a predetermined value (for example, 3%/ms) during the execution of the first smart pedal control mode in operation S126, the controller 100 releases the first smart pedal control mode, that is, the mode of controlling the engine 10 with the idle RPM, and drives the engine 10 in a normal mode (S128, S134, and S136).

When the variation of the signal of the APS is equal to or smaller than the predetermined value (for example, 3%/ms) in operation S128, the controller 100 determines whether a value of the signal of the APS or a value of the signal of the BPS is 0, and when the value of the signal of the APS or the value of the signal of the BPS is 0, the controller 100 releases the mode of controlling the engine 10 with the idle RPM, and drives the engine 10 in the normal mode (S132, S134, and S136).

In the meantime, when the variation of the signal of the APS exceeds a predetermined value (for example, 3%/ms) during the execution of the second smart pedal control mode in operation S121, the controller 100 releases the second smart pedal control mode, that is, the mode of controlling the engine 10 with the engine state limited torque (experimental value), and controls the engine 10 in the normal mode (S123, S127, and S129).

When the variation of the signal of the APS is equal to or smaller than the predetermined value (for example, 3%/ms) in operation S123, the controller 100 determines whether a value of the signal of the APS is 0, and when the value of the signal of the APS is 0, the controller 100 releases the mode of controlling the engine 10 with the engine state limited torque (experimental value) and controls the engine 10 in the normal mode (S127 and S129).

Figure 3:
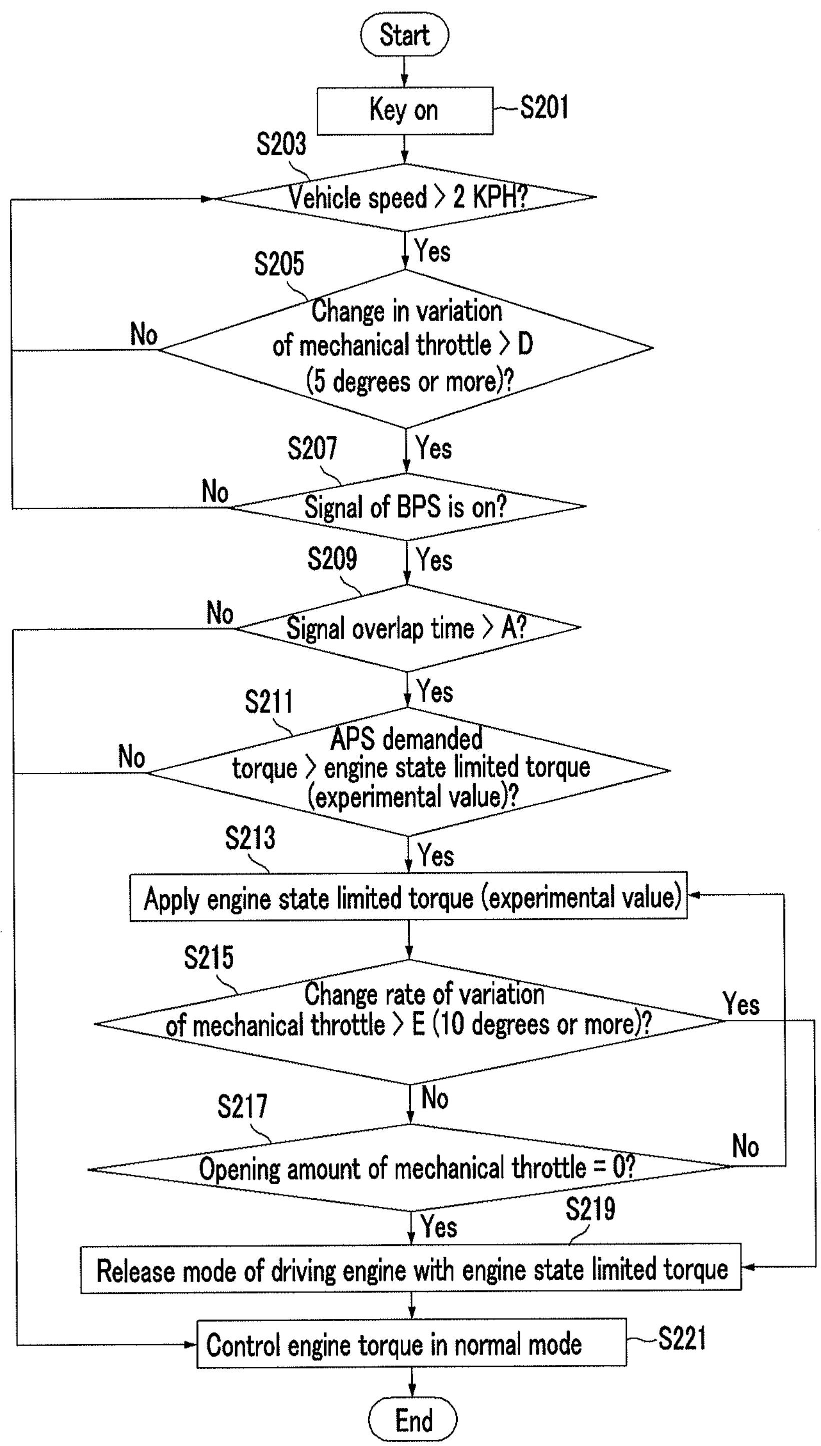
FIG. 3 is a flowchart illustrating an exemplary vehicle driving control method according to the present invention.

FIG. 3 is a flowchart illustrating a vehicle driving control method according to various embodiments of the present invention.

The vehicle driving control method according to various embodiments of the present invention may be implemented in a vehicle to which a mechanical throttle body is applied. In the vehicle driving control method according to various embodiments of the present invention, the APS may be a sensor detecting only whether the accelerator pedal is operated, that is, an on-state of the accelerator pedal, and not-detecting a variation according to a movement of the accelerator pedal.

As illustrated in FIG. 3, the controller 100 determines whether a vehicle speed detected by the vehicle speed sensor 160 exceeds a predetermined speed (for example, 2 KPH) in a key-on state, that is, during an operation of the vehicle (S201 and S203).

When the vehicle speed exceeds the predetermined speed (for example, 2 KPH), the controller 100 determines whether an opening quantity of a mechanical throttle 18 exceeds a predetermined opening degree (for example, 5 degrees) through the TPS 180 (S205).

When the opening quantity of the mechanical throttle 18 exceeds the predetermined opening degree, the controller 100 determines whether a signal of the BPS is input for a predetermined time (for example, 0.5 second) in the state where the opening quantity of the mechanical throttle 18 exceeds the predetermined opening degree (S207 and S209).

When the signal of the BPS is input for the predetermined time (for example, 0.5 second) in the state where the opening quantity of the mechanical throttle 18 exceeds the predetermined opening degree, the controller 100 determines whether a demanded torque corresponding to a signal of a signal of the APS is greater than a torque limited value corresponding to an actual engine state (S211). The torque limited value corresponding to the actual engine state is a value pre-determined and set by an experimental value.

When the demanded torque corresponding to the size of the signal of the APS is greater than the torque limited value corresponding to the actual engine state in operation S211, the controller 100 executes a third smart pedal control mode of driving the engine 10 by setting an output torque of the engine to the torque limited value corresponding to the actual engine state (S213).

When an opening quantity variation of the throttle (or throttle valve) 18 detected by the TPS 180 exceeds a predetermined value (for example, 10 degrees) during an execution of the third smart pedal control mode in operation S213, or an opening quantity variation of the mechanical throttle 18 is 0 (S215 and S217), the controller 100 releases the mode of controlling the engine 10 with the engine state limited torque (experimental value) and controls the engine 10 in a normal mode (S219 and S221).

Accordingly, according to various embodiments of the present invention, it is possible to improve safety of the vehicle by applying the smart pedal control of safely driving a vehicle when an operation of the brake pedal and an operation of the accelerator pedal overlap for over a predetermined time to a mechanical throttle body applied vehicle, as well as an ETC applied vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling driving of a vehicle, comprising:

determining by a controller whether a vehicle speed exceeds a predetermined speed;

determining by the controller whether a signal of an accelerator position sensor (APS) is input as a signal of an accelerator pedal;

determining by the controller whether a signal of a brake position sensor (BPS) is input as a signal of a brake pedal;

determining by the controller whether the signal of the BPS is input while overlapping the signal of the APS for over a predetermined time in a state where the signal of the APS is being input;

determining by the controller whether the signal of the APS is input while overlapping the signal of the BPS for over a predetermined time in a state where the signal of the BPS is first being input;

driving an engine by the controller in a first smart pedal control mode of limiting an RPM of the engine to an idle RPM when the signal of the BPS is input while overlapping the signal of the APS for over the predetermined time in the state where the signal of the APS is being input; and executing a second smart pedal control mode of driving the engine by the controller by setting an output torque of the engine to a torque limited value corresponding to an actual engine state when the signal of the APS is input while overlapping the signal of the BPS for over the predetermined time in a state where the signal of the BPS is first being input, and a demanded torque corresponding to a size of the signal of the APS is greater than the torque limited value corresponding to the actual engine state.

2. The method of claim 1, further comprising releasing the first smart pedal control mode by the controller when a variation of the signal of the APS exceeds a predetermined value during execution of the first smart pedal control mode.

3. The method of claim 1, further comprising releasing the first smart pedal control mode by the controller when a value of the signal of the APS or a value of the signal of the BPS is 0 during execution of the first smart pedal control mode.

4. The method of claim 1, further comprising releasing the second smart pedal control mode by the controller when a variation of the signal of the APS exceeds a predetermined value during the execution of the second smart pedal control mode.

5. The method of claim 1, further comprising releasing the second smart pedal control mode by the controller when a value of the signal of the APS is 0 during the execution of the second smart pedal control mode.

6. A method of controlling driving of a vehicle, to which a mechanical throttle body is applied, the method comprising:

determining by a controller whether a vehicle speed exceeds a predetermined speed;

determining by the controller an opening quantity of a mechanical throttle detected by a throttle position sensor (TPS) exceeds a predetermined opening degree;

determining by the controller whether a signal of a BPS is input for a predetermined time in a state where the opening quantity of the mechanical throttle exceeds the predetermined opening degree; and executing a third smart pedal control mode of driving an engine by the controller by setting an output torque of the engine to a torque limited value corresponding to an actual engine state when the signal of the BPS is input for the predetermined time in the state where the opening quantity of the mechanical throttle exceeds the predetermined opening degree, and a demanded torque corresponding to an operation quantity of an accelerator pedal is greater than the torque limited value corresponding to the actual engine state.

7. The method of claim 6, further comprising releasing the third smart pedal control mode by the controller when a variation rate of the opening quantity of the throttle value detected by the TPS exceeds a predetermined value during an execution of the third smart pedal control mode, or when the opening quantity of the mechanical throttle valve is 0.

8. A system for controlling driving of a vehicle, comprising:

a vehicle speed sensor configured to detect a vehicle speed;

an accelerator position sensor (APS) configured to detect an on-state and an operation quantity of an accelerator pedal;

a brake position sensor (BPS) configured to detect an on-state and an operation quantity of a brake pedal;

a throttle position sensor (TPS) configured to detect an opening quantity of a throttle;

an engine configured to provide driving force of the vehicle; and an engine control unit configured to control the engine based on signals of the vehicle speed sensor, the APS, the BPS, and the TPS, wherein the engine control unit executes a command for performing the method of claim 1.

* * * * *